(12) United States Patent
Zhou

(10) Patent No.: US 10,408,296 B2
(45) Date of Patent: Sep. 10, 2019

(54) METAL STAMPING TOOL WITH A HYBRID MAGNETORHEOLOGICAL-NITROGEN SPRING

(71) Applicant: Dajun Zhou, Troy, MI (US)

(72) Inventor: Dajun Zhou, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 612 days.

(21) Appl. No.: 15/053,444

(22) Filed: Feb. 25, 2016

(65) Prior Publication Data

US 2017/0246672 A1    Aug. 31, 2017

(51) Int. Cl.
*B21D 24/08* (2006.01)
*F16F 13/00* (2006.01)
*F16F 9/53* (2006.01)
*F16F 9/06* (2006.01)

(52) U.S. Cl.
CPC ............ *F16F 13/002* (2013.01); *B21D 24/08* (2013.01); *F16F 9/061* (2013.01); *F16F 9/535* (2013.01)

(58) Field of Classification Search
CPC ........ B21D 22/02; B21D 22/06; B21D 22/10; B21D 22/22; B21D 24/02; B21D 24/04; B21D 24/08; B21D 24/14; F16F 9/535; F16F 13/002
See application file for complete search history.

(56) References Cited

U.S. PATENT DOCUMENTS

| | | | | |
|---|---|---|---|---|
| 2,661,596 A | * | 12/1953 | Winslow | C10M 171/001 192/21.5 |
| 5,065,607 A | * | 11/1991 | Kadis | B21D 22/22 267/119 |
| 5,499,525 A | * | 3/1996 | Kordak | B21D 24/08 100/259 |
| 6,290,033 B1 | * | 9/2001 | Oliver | F16D 37/02 188/267.1 |
| 6,311,810 B1 | | 11/2001 | Hopkins et al. | |
| 6,382,369 B1 | * | 5/2002 | Lisenker | F16F 9/535 188/267 |
| 7,204,481 B2 | * | 4/2007 | Sears | B23K 11/11 269/266 |

(Continued)

FOREIGN PATENT DOCUMENTS

| CN | 1181332 C | 12/2004 |
|---|---|---|
| CN | 100443211 C | 12/2008 |

(Continued)

OTHER PUBLICATIONS

Translation, KR 10-1452734 B1, Oct. 2014.*

(Continued)

*Primary Examiner* — Edward T Tolan

(74) *Attorney, Agent, or Firm* — Ralph E. Smith

(57) ABSTRACT

A metal stamping tool includes a hybrid magnetorheological-nitrogen spring including a housing having an interior wall defining an interior volume. A fixed divider separates the interior volume into a nitrogen gas chamber and a magnetorheological fluid chamber. A piston extends into both the nitrogen gas chamber and the magnetorheological fluid chamber. The piston defines a magnetorheological fluid gap within the magnetorheological fluid chamber. An electric coil positioned adjacent the fluid gap to apply a magnetic field to magnetorheological fluid within the fluid gap when the electric coil is energized.

9 Claims, 2 Drawing Sheets

(56) References Cited

U.S. PATENT DOCUMENTS

| | | | |
|---|---|---|---|
| 7,257,460 B2 | 8/2007 | Venugopal et al. | |
| 7,428,922 B2 | 9/2008 | Fripp et al. | |
| 7,891,226 B2 | 2/2011 | Seo | |
| 2009/0294231 A1* | 12/2009 | Carlson | F16F 9/537 188/267.2 |
| 2010/0032254 A1 | 2/2010 | Anderfaas et al. | |

FOREIGN PATENT DOCUMENTS

| | | | | |
|---|---|---|---|---|
| CN | 202220821 U | 5/2012 | | |
| CN | 102367858 B | 3/2013 | | |
| CN | 103591208 A | 2/2014 | | |
| DE | 10161972 A1 * | 6/2003 | | F16F 9/535 |
| KR | 10-1452734 B1 * | 10/2014 | | B21D 22/20 |

OTHER PUBLICATIONS

Translation, DE 10161972 A1, Jun. 2003.*
R.A. Ayres, "Shapeset: A Process to Reduce Sidewall Curl Springback in High-Strength Steel Rails", J. Applied Metalworking, © 1984 American Society for Metals, vol. 3, No. 2, Jan. 1984, pp. 127-134.

* cited by examiner ions of the stamping tool springs have involved
complicated systems that adjust the amount of fluid (gas or
liquid) within the compression chamber of the spring. U.S.
Pat. No. 7,257,460, incorporated herein by reference, is an
example of such complicated systems, which require
hydraulic pumping units, manifold piping systems, hydraulic cooling systems, additional power systems, etc. Such
complex systems are costly to implement and operate.

In addition to the complexity and costs of such additional
systems, any such fluid adjustment takes time, which
negates the possibility of an instantaneous discontinuity or
force jump, and requires an interruption or otherwise
increases the stamping cycle time. Increasing the stamping
cycle time reduces the number of parts that a metal stamping
tool is able to stamp during a shift. Increased stamping cycle
time increases both operational costs and capital costs of
additional stamping tools that must be purchased to meet
demand. All of these increased costs must be amortized over
the number of parts each tool is able to stamp. Thus, even
small increases in stamping cycle time often dramatically
increase the costs per stamped part. As a result, it is desirable
to provide a metal stamping tool with springs that are
capable of instantly changing its force-to-travel relationship
during a stamping cycle.

METAL STAMPING TOOL WITH A HYBRID MAGNETORHEOLOGICAL-NITROGEN SPRING

FIELD

The present disclosure relates to metal stamping tools, such as those that include nitrogen gas springs.

BACKGROUND

Metal stamping tools often use nitrogen gas springs. Such springs, however, exhibit a linear force-to-travel distance relationship. There are situations, where a non-linear or discontinuous force-to-travel distance relationship (or force jump) would be advantageous in metal stamping operations. For example, certain hard-to-form metals, such as high strength steels and aluminum alloys, have a tendency to spring back after stamping to an unacceptable shape.

One solution to such unacceptable metal spring-back is to apply a significantly different force to the metal at different points in the stamping operation. For example, causing the stamping tool to apply a significantly greater force to the metal via the springs near the end of a stamping cycle acts as a post stretching force, which has been found to minimize or eliminate undesirable spring back as described, e.g., in "SHAPESET: A process to Reduce Sidewall Curl Springback in High-Strength Steel Rails: published in the Journal of Applied Metalworking, in January, 1984.

Attempts to accomplish changes in the force-to-travel relationship of the stamping tool springs have involved complicated systems that adjust the amount of fluid (gas or liquid) within the compression chamber of the spring. U.S. Pat. No. 7,257,460, incorporated herein by reference, is an example of such complicated systems, which require hydraulic pumping units, manifold piping systems, hydraulic cooling systems, additional power systems, etc. Such complex systems are costly to implement and operate.

In addition to the complexity and costs of such additional systems, any such fluid adjustment takes time, which negates the possibility of an instantaneous discontinuity or force jump, and requires an interruption or otherwise increases the stamping cycle time. Increasing the stamping cycle time reduces the number of parts that a metal stamping tool is able to stamp during a shift. Increased stamping cycle time increases both operational costs and capital costs of additional stamping tools that must be purchased to meet demand. All of these increased costs must be amortized over the number of parts each tool is able to stamp. Thus, even small increases in stamping cycle time often dramatically increase the costs per stamped part. As a result, it is desirable to provide a metal stamping tool with springs that are capable of instantly changing its force-to-travel relationship during a stamping cycle.

SUMMARY

In an aspect of the present disclosure, a metal stamping tool includes a hybrid magnetorheological-nitrogen spring including a housing having an interior wall defining an interior volume. A fixed divider separates the interior volume into a nitrogen gas chamber and a magnetorheological fluid chamber. A piston extends into both the nitrogen gas chamber and the magnetorheological fluid chamber. The piston defines a magnetorheological fluid gap within the magnetorheological fluid chamber. An electric coil is positioned adjacent the fluid gap to apply a magnetic field to magnetorheological fluid within the fluid gap when the electric coil is energized.

In additional aspects of the present disclosure, the hybrid magnetorheological-nitrogen spring is coupled to at least one of a binder and a pad of the stamping tool; the electric coil is carried by the piston; and an outer wall of the piston surrounds the electric coil and defines a portion of the fluid gap.

In an aspect of the present disclosure, the electric coil has a pre-discontinuity state in which a pre-discontinuity current is supplied to the coil causing the spring to exhibit a pre-discontinuity force-to-travel ratio and a post-discontinuity state in which a post-discontinuity current is supplied to the coil causing the spring to exhibit a post-discontinuity force-to-travel ratio.

In further aspects of the present disclosure, the pre-discontinuity current is zero; the spring exhibits a change from the pre-discontinuity state to the post-discontinuity state that is substantially instantaneous; and the tool has an operating state in which a stamping speed of the tool does not need to be altered during a change from the pre-discontinuity state to the post-discontinuity state.

DRAWINGS

The present invention will become more fully understood from the detailed description and the accompanying drawings.

DETAILED DESCRIPTION

Figure 1:
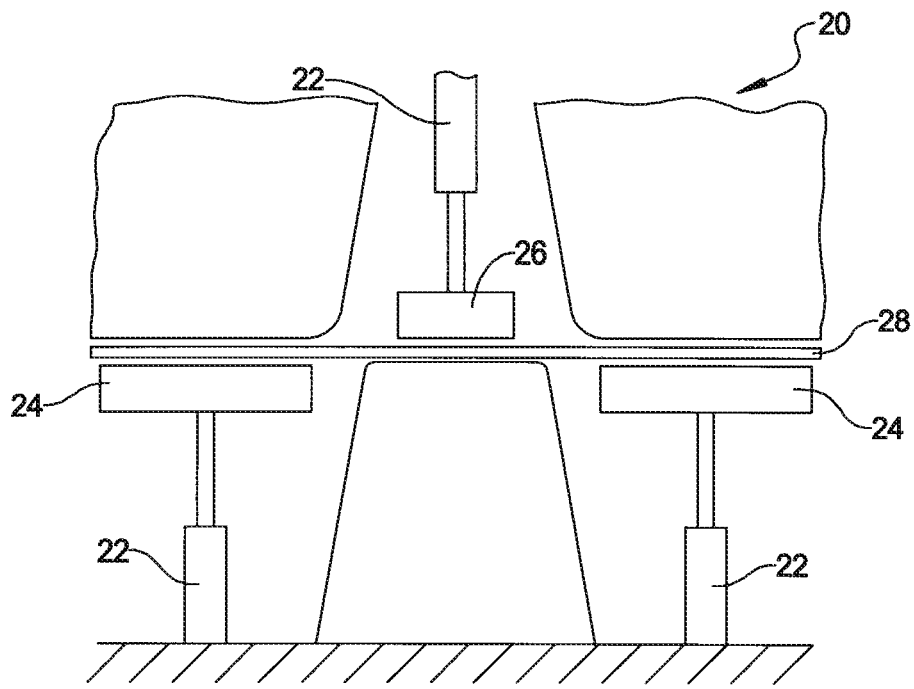
FIG. 1 is a simplified partial elevation view of a metal stamping tool including hybrid magnetorheological-nitrogen springs in accordance with an aspect of the disclosure, positioned at the beginning of a stamping cycle.

Further areas of applicability will become apparent from the description, claims and drawings, wherein like reference numerals refer to like features throughout the several views of the drawings. It should be understood that the detailed description, including disclosed embodiments and drawings referenced therein are merely exemplary in nature, intended for purposes of illustration only, and are not intended to limit the scope of the present disclosure.

Figure 2:
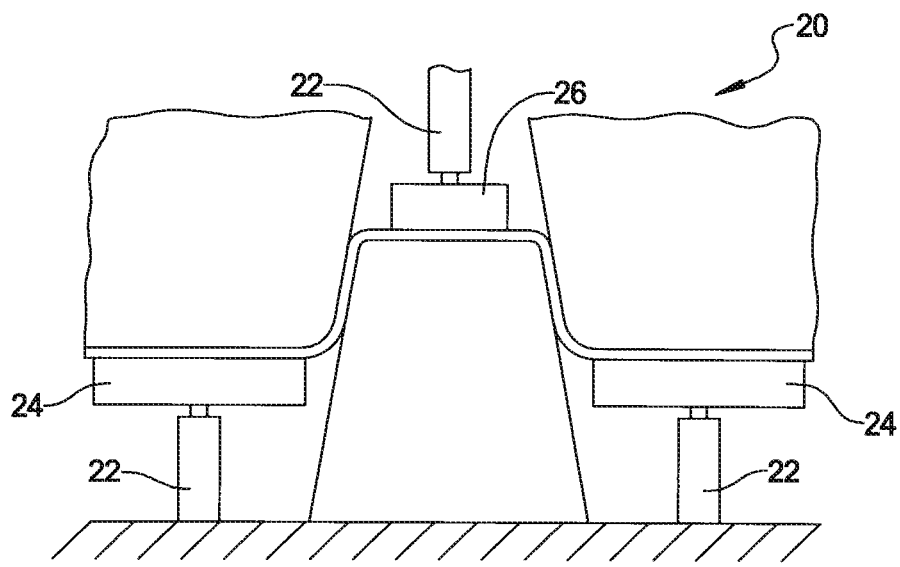
FIG. 2 is a simplified partial elevation view of a metal stamping tool of FIG. 1, but with the components positioned at the end of a stamping cycle.

In the illustrated exemplary embodiment of FIG. 1 and FIG. 2, a metal stamping tool 20 incorporates several hybrid magnetorheological-nitrogen springs 22. The springs 22 are coupled to a binder 24 and a pad 26 of the metal stamping tool 20. FIG. 1 illustrates an initial position of the relative components about to contact the metal sheet 28 being stamped, while FIG. 2 illustrates a final position of the relative components.

Figure 3:
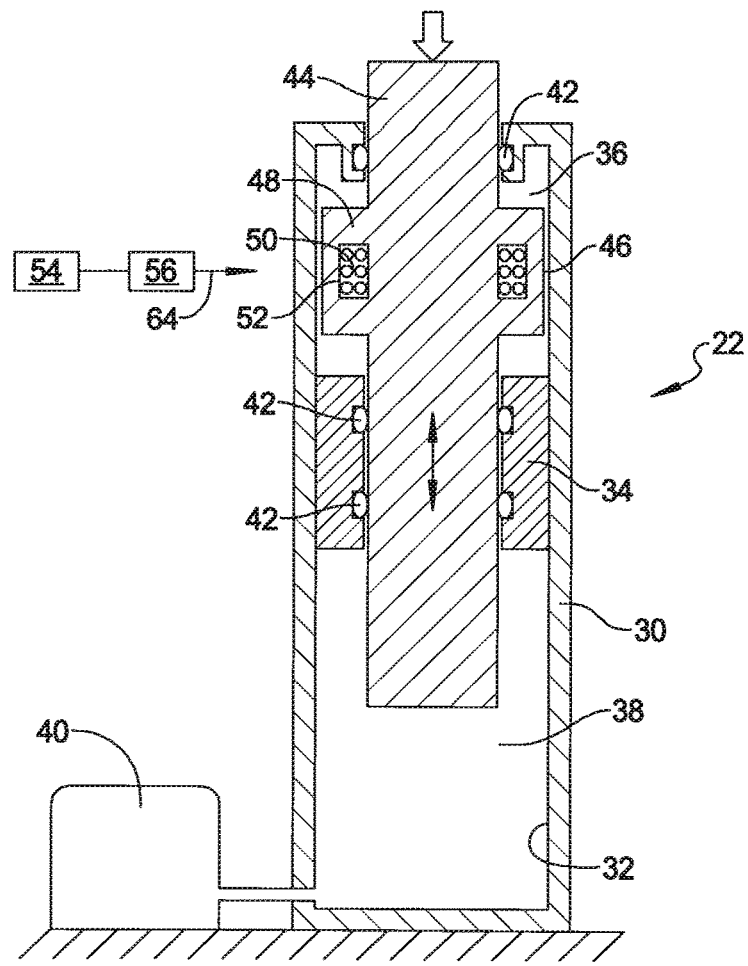
FIG. 3 is a cross-sectional view of a hybrid magnetorheological-nitrogen spring of the metal stamping tool of FIG. 1.

Referring to FIG. 3, each of the illustrated exemplary hybrid magnetorheological-nitrogen springs 22 includes a housing 30 having an interior wall 32 defining an interior volume of the housing 30. A divider 34 is positioned within the housing 30 in a fixed position and separates the interior volume into a nitrogen gas chamber 38 and a magnetorheological fluid chamber 36. Seals 42 are provided to avoid or minimize leakage from the housing 30 and between the nitrogen gas chamber 38 and a magnetorheological fluid chamber 36.

Figure 4:
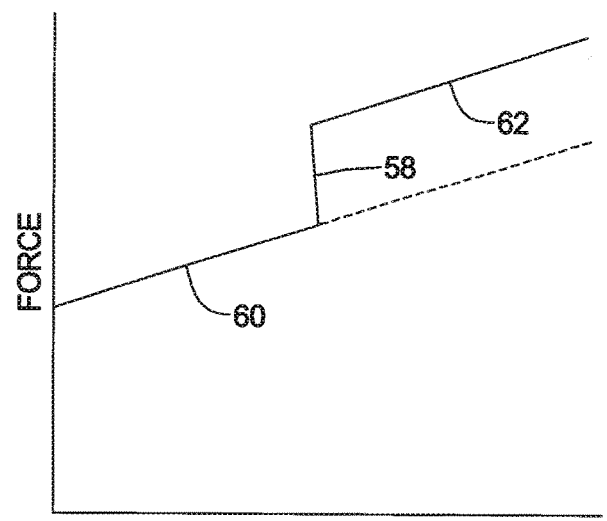
FIG. 4 is a graph of the relationship between the force and compression distance of the hybrid magnetorheological-nitrogen spring of FIG. 3.

In an aspect, a tank 40 is used to provide a desired, increased volume of the nitrogen gas chamber. Such an increased volume provides the magnetorheological-nitrogen springs 22 with a relatively more flat force-to-travel distance ratio or slope. Alternatively, decreasing the volume of the nitrogen gas chamber 38 provides the magnetorheological-nitrogen springs 22 with a relatively more sloped or angled force-to-travel distance ratio or slope. FIG. 4 provides one example of such a force-to-travel distance ratio.

A piston 44 is mounted in the housing 30 for reciprocal movement and completes the separation between the chambers 36, 38. The piston 44 defines a relatively narrow gap 46 between an expanded portion 48 of piston 44 and the interior wall 32 of the housing 30. In the illustrated example, both the expanded portion 48 of the piston 44 and the interior wall 32 of the housing 30 are cylindrical in shape and the relatively narrow gap 46 uniformly encompasses the entire circumference of the piston 44. Of course, alternative shapes and gap arrangements are possible.

An electric coil 50 is positioned adjacent the gap 46 to apply a magnetic field to magnetorheological fluid within the gap 46 when the electric coil 50 is energized. In the illustrated example, the coil 50 is carried in a cavity within the piston 44 and an outer wall 52 of the piston 44 surrounds the electric coil 50 to define a portion of the gap 46. Alternatively, no outer wall 52 is provided, and instead of being enclosed, the coil 50 is exposed to define a portion of the gap 46 with the inner surface 32 of the housing 30.

A current source 54 is electrically coupled to a current control circuit 56 to selectively supply a current of a desired magnitude to the electric coil 52 via wires 64. For example, wires 64 pass through a passage (not shown) extending from a distal end of the piston 44 to the coil 50. FIG. 4 illustrates an exemplary essentially instantaneous discontinuity 58 in the force-to-travel ratio that occurs when a desired magnitude of current is selectively supplied to the coil 50. The magnitude of the discontinuity 58 is related the differential between the magnitude of any pre-discontinuity current and the post-discontinuity current that is supplied to the coil 50.

In an aspect, the discontinuity in the hybrid magnetorheological-nitrogen spring is substantially instantaneous, which means the force that the spring exerts is able to change substantially instantaneously. In other words, there is no need to interrupt or otherwise extend the metal stamping cycle of the tool in order to change the force exerted by the spring on the metal being stamped. Thus, the springs exhibit a change from the pre-discontinuity state to the post-discontinuity state that is substantially instantaneous. Alternatively or additionally, the tool has an operating state in which a stamping speed of the tool remains substantially uniform throughout a stamping cycle during which the spring 22 exhibits a discontinuity 58 in the spring's force-to-travel ratio.

Many benefits flow from such a substantially instantaneous discontinuity or change in the force-to-travel ratio. For example, the spring operates during a prior portion of the metal stamping cycle at a first desired force-to-travel ratio, and at a second, higher force-to-travel ratio during a subsequent portion of the stamping cycle to minimize or eliminate problematic spring back of high strength steels.

In addition, by adjusting the magnitude of the current supplied to the coil 50, both before and after the discontinuity, the magnitude of the discontinuity or force jump 58 is adjustable and the magnitude of the prior and subsequent forces or force-to-travel ratios 60, 62 are adjustable. Further, in a variable binder force mode, a series of force jumps or discontinuities 58 are provided by cycling current to the coil 50, between different desired current magnitudes. For example, alternating or cycling the current between high and low states, e.g., on and off, provides a pulsation of the tool to sheet metal contact force, which improves lubrication coverage and the metal flow condition. Thus, the metal stamping tool 20 is readily adaptable to different stamping operations requiring different spring force ratios without the need to replace or supplement the existing springs of the tool.

In an aspect, the electric coil of the hybrid magnetorheological-nitrogen springs have a pre-discontinuity state in which a pre-discontinuity current is supplied to the coil causing the spring to exhibit a pre-discontinuity force-to-travel ratio 60 and a post-discontinuity state in which a post-discontinuity current is supplied to the coil causing the spring to exhibit a post-discontinuity force-to-travel ratio 62. In some instances, the pre-discontinuity current is zero, and the pre-discontinuity force-to-travel ratio 60 is provided by the nitrogen gas acting on the piston 44. Alternatively, the pre-discontinuity current is not zero and both the pre-discontinuity force-to-travel ratio 60 and the post-discontinuity force-to-travel ratio 62 is provided by both the nitrogen gas and the energized magnetorheological fluid acting upon the piston 44.

In an aspect, the current control circuit 56 supplies the desired current to the coil 50 at a predetermined point in the stamping cycle. In an aspect, the current control circuit 56 includes a clock or timing circuit and the predetermined point in the stamping cycle is a point in time after initiation of the stamping cycle. Alternatively or additionally, the control circuit 56 includes a one or more sensors (not shown) related to stamping process parameters, including ram travel, material draw-in distance, forming force, and temperature. For example, with a ram travel sensor the predetermined point in the stamping cycle is a position of the piston 44 relative to the housing 30. In an additional aspect, the predetermined point in the stamping cycle is a point near the end of the stamping cycle enabling the elimination of undesirable spring back when stamping high strength steel.

In an aspect, the current control circuit 56 includes a simple switch, such as a transistor, to connect or disconnect the current source 54 to the coil 50. Additionally or alternatively, the current control circuit 56 includes a pulse width modulation driver to supply an effective current of a desired magnitude to the coil 50. Thus, the desired post-discontinuity current magnitude that the current control circuit 56 supplies to the coil 50 is chosen from one of a plurality of potential magnitudes. Additionally or alternatively, the current control circuit 56 is a closed loop control circuit to adjust the magnitude of the supplied current to achieve a desired discontinuity 58 or force increment.

In an aspect, the current control circuit 56 includes a microprocessor, capable of controlling the supply of desired current to each spring 22 or any group of springs 22 independently. In an aspect, a single current control circuit 56 is part of a press-tool-automation system that provides current control for individual or groups of springs 22 of multiple stamping tools of a press line.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A metal stamping tool comprising:
a hybrid magnetorheological-nitrogen spring including a housing having an interior wall defining an interior volume;
a fixed divider separating the interior volume into a nitrogen gas chamber and a magnetorheological fluid chamber;
a piston extending into both the nitrogen gas chamber and the magnetorheological fluid chamber and defining a magnetorheological fluid gap within the magnetorheological fluid chamber;
an electric coil positioned adjacent the fluid gap to apply a magnetic field to magnetorheological fluid within the fluid gap when the electric coil is energized.

2. The metal stamping tool of claim 1, wherein the hybrid magnetorheological-nitrogen spring is coupled to at least one of a binder and a pad of the stamping tool.

3. The metal stamping tool of claim 1, wherein the electric coil is carried by the piston.

4. The metal stamping tool of claim 3, wherein an outer wall of the piston surrounds the electric coil and defines a portion of the fluid gap.

5. The metal stamping toot of claim 1, wherein the electric coil has a pre-discontinuity state in which a pre-discontinuity current is supplied to the coil causing the spring to exhibit a pre-discontinuity force-to-travel ratio and a post-discontinuity state in which a post-discontinuity current is supplied to the coil causing the spring to exhibit a post-discontinuity force-to-travel ratio.

6. The metal stamping tool of claim 5, wherein the pre-discontinuity current is zero.

7. The metal stamping tool of claim 5, wherein the spring exhibits a change from the pre-discontinuity state to the post-discontinuity state that is substantially instantaneous.

8. The metal stamping tool of claim 5, wherein the tool has an operating state in which a stamping speed of the tool does not need to be altered during a change from the pre-discontinuity state to the post-discontinuity state.

9. The metal stamping tool of claim 5, wherein the tool has an operating state in which a current supplied to the coil is alternated between the pre-discontinuity current and the post discontinuity current.

* * * * *